Figure 1:
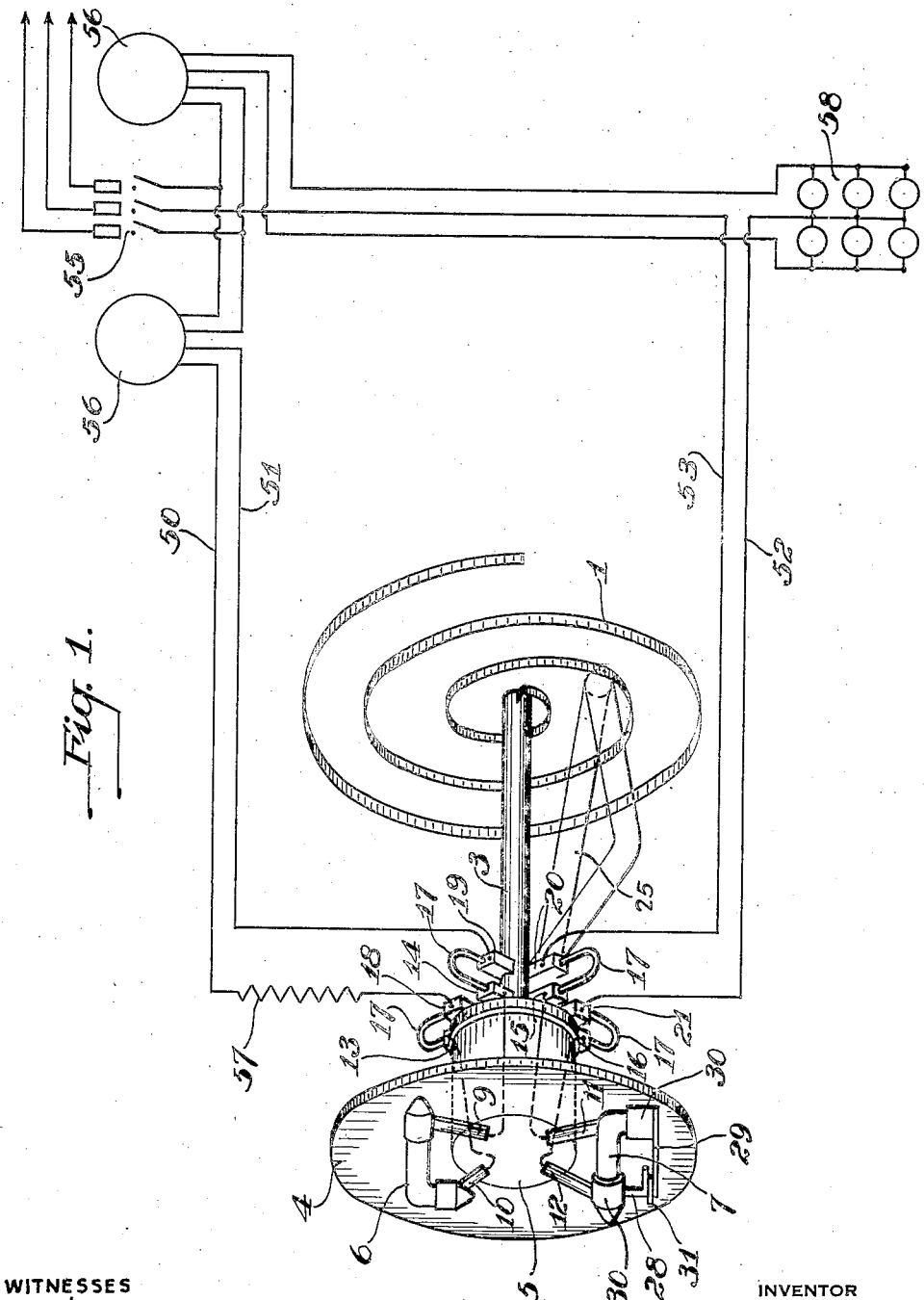

March 4, 1930.   C. E. BOGGS   1,749,693
CONTROL SWITCH
Original Filed April 10, 1926   3 Sheets-Sheet 1

WITNESSES
INVENTOR
Clarence E. Boggs.

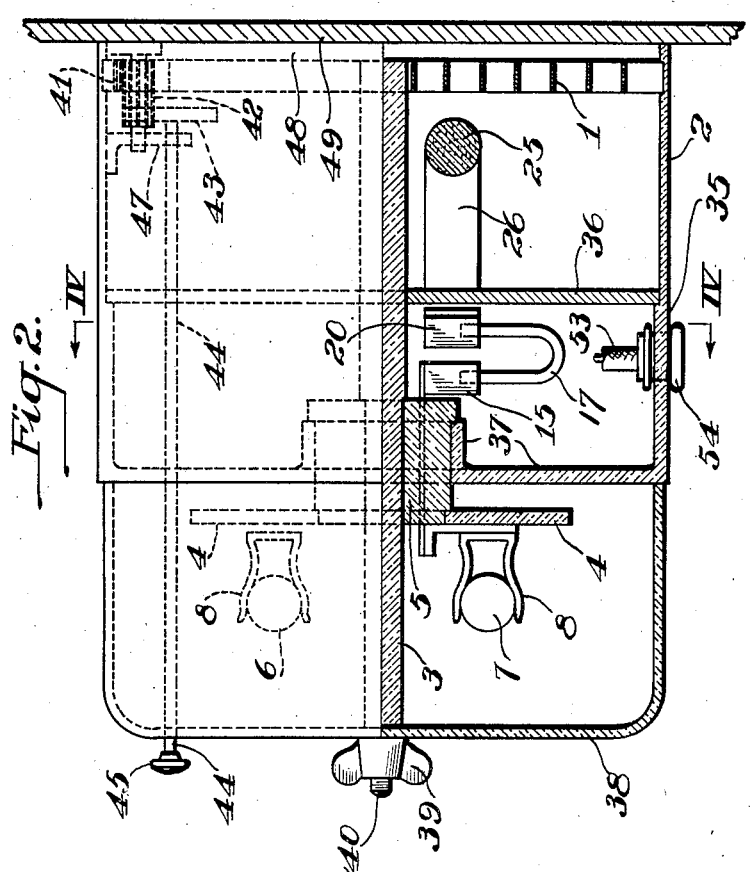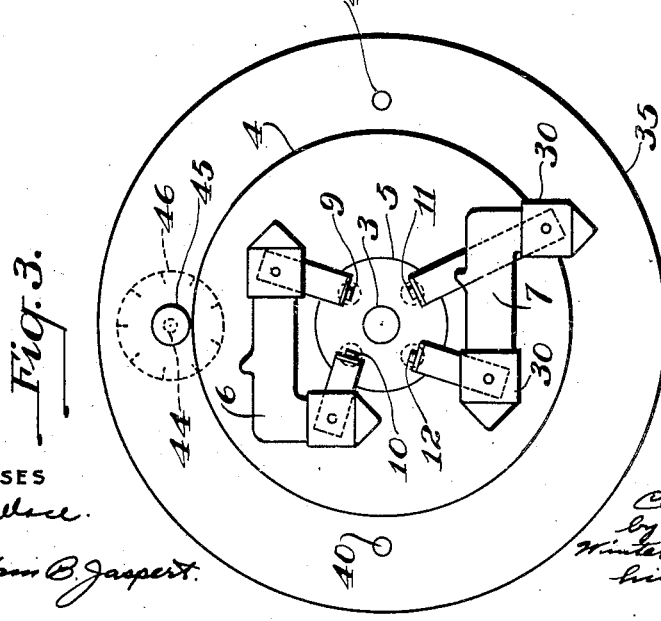

March 4, 1930.  C. E. BOGGS  1,749,693
CONTROL SWITCH
Original Filed April 10, 1926  3 Sheets-Sheet 3

WITNESSES

INVENTOR

Patented Mar. 4, 1930

1,749,693

UNITED STATES PATENT OFFICE

CLARENCE E. BOGGS, OF BOISE, IDAHO, ASSIGNOR TO EDISON ELECTRIC APPLIANCE COMPANY, INC., A CORPORATION OF NEW YORK

CONTROL SWITCH

Original application filed April 10, 1926, Serial No. 101,150. Divided and this application filed October 5, 1926. Serial No. 139,629. Renewed December 4, 1929.

This invention relates to thermostatic switches for use in heating systems or the like, and the present application is a division of an application bearing Serial No. 101,150, filed April 10, 1926, entitled "Electric heating system".

It is among the objects of this invention to provide a thermostatic switch which shall be adapted to automatically regulate the flow of current in a plurality of connected heating units to so correlate the function of such units as to render them severally operative and which shall function automatically to cut off one of said units from the common power circuit while the other of said units is operative.

Another object of this invention is to provide a thermostatic switch which shall function to control the temperature of one of the heating units with which it is electrically connected independently of its cooperative function with the other of said units.

Another object of this invention is to provide a combination relay and thermal switch of the above designated character which shall comprise a minimum number of operating parts contained in a housing to constitute a simple, compact unit for application to electric heating systems.

Where electric cooking ranges are employed for domestic use an electric water heater is found to be a necessary adjunct on account of the elimination of the coal or gas fire range with its water heating coils. My invention is particularly applicable for use in electric range and water-heating systems, using three-wire circuits, to provide regulation of the load upon the individual customer's service wires.

On account of the heat storing characteristics of water, electric energy for water heaters may be utilized at a time when there is no demand for energy for cooking purposes, and in accordance with my present invention I provide a thermostatic switch which shall be adapted to function as a combination range and water heater alternating switch or relay and a water heater thermal switch, thus making the load characteristics of heating systems in which a range and water heater are connected controllable by automatic regulation to the extent of making the water heating an "off peak" load with respect to the range load.

My thermostatic switch is also adapted to function as a thermal switch for water heaters to automatically open the water heater circuit when the temperature of the water has reached a predetermined maximum and to automatically close the circuit when the temperature has dropped. The thermostatic switch functioning as a thermal unit effects a great saving of energy not only in the prevention of waste by the boiling of the water but also in its automatic regulation of the water heater to consume no more energy than is necessary for maintaining the water at a proper temperature.

In accordance with the present invention the thermostatic switch may be employed as an alternating switch or relay as hereinabove set forth, or as a water heater thermal switch or both, as will be hereinafter more fully set forth in connection with a detailed description of the drawings.

Figure 4:
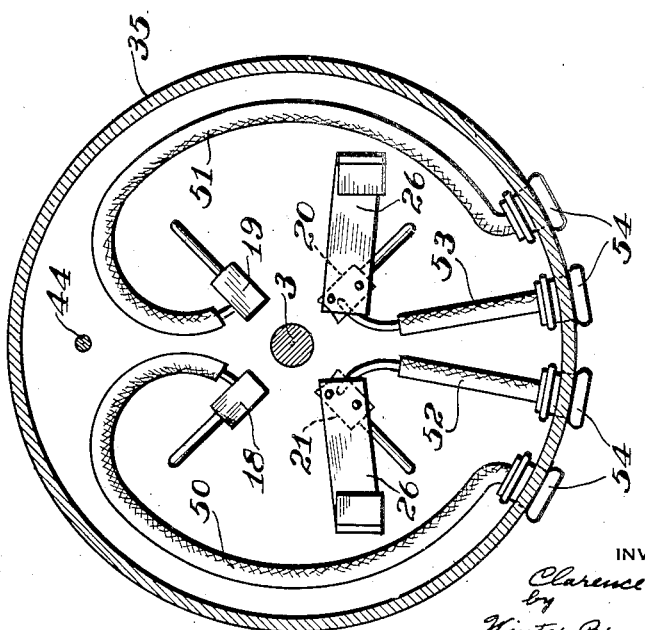

In the accompanying drawings constituting a part hereof in which like reference characters designate like parts. Fig. 1 is a view in perspective of a thermostatic switch embodying the principles of my invention, together with a diagram illustrating its connection in a domestic heating system; Fig. 2 is a view partially in side elevation and partially in section of the thermostatic switch assembled in a housing member to constitute a unit; Fig. 3 is an end elevational view thereof with a portion of the housing member removed; Fig. 4 is a cross sectional view taken along the line IV—IV, Fig. 2; and Fig. 5 is an elevational view of the temperature control actuating member by means of which the several cooperating elements of the switch mechanism are operated.

Figure 5:
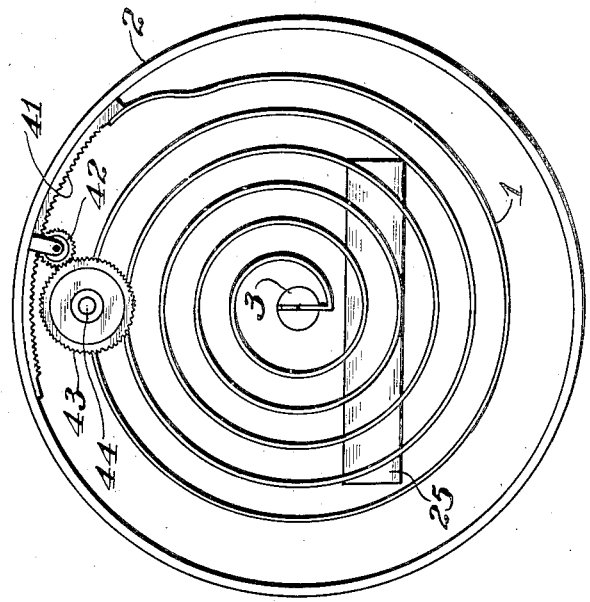

Referring to Fig. 1 of the drawings the structure therein illustrated comprises a bimetallic bar 1 of spiral shape fastened in the manner of a clock spring by securing one end thereof to an adjustable member in the casing or housing member 2, as shown in Fig. 5 and having its other end secured to shaft 3. Figs. 1 and 5, which is actuated by the spiral bar 1 in accordance with temperature changes to which the latter is subjected.

On the end of the shaft 3 there is provided an insulating disk 4 secured to a bushing 5 of insulating material which is adapted to rotate with the shaft 3 and a pair of mercury switches 6 and 7 of the tilting type are secured to the disk 4 by spring clips 8 shown in Fig. 2. The switches 6 and 7 are connected to binding posts 9 and 10 and 11 and 12, respectively, as shown in Fig. 3, these posts being in turn connected to terminals 13 and 14 and 15 and 16, respectively, as shown in Fig. 1, the terminals 13 and 14, 15 and 16 being respectively connected by flexible leads 17 to stationary terminals 18, 19, 20 and 21.

A resistor element 25, Fig. 2, is mounted adjacent the spiral bi-metallic member 1 between conductors 26 secured to the stationary terminals 20 and 21 which as previously explained are connected to the terminals of the tilting switch 7 which when closed constitutes a by-pass or shunt on the resistor 25. A shunt gap comprising a pair of contact elements 28 and 29 is provided on the ferrules 30 of the switch 7 and a high resistance wire 31 is inserted therebetween for the purpose as will be hereinafter set forth.

Referring to Figs. 2, 3, 4 and 5, the housing member 2 comprises a casing 35 having a partition or wall 36 extending therethrough to provide a thermal chamber in which the spiral member 1 and the resistor element 25 are disposed. The end of the casing 35 is provided with a flanged portion 37 which constitutes a bearing for the sleeve 5 which is secured to rotate with the shaft 3 and on which is mounted the insulating disk 4. A glass cover 38 is adapted to be fastened on the casing 35 by a plurality of wing nuts 39 which interact with the threaded portion of posts 40 extending from the casing 35, thus constituting the thermostatic switch a compact self-contained unit.

For the purpose of adjusting the spiral member 1 to actuate the shaft member 3 at certain desired temperatures within the thermal chamber I have provided an adjusting device comprising a gear rack 41 secured to the end of the spiral bar 1 and cooperatively engaged with a pinion 42 that meshes with a gear 43 mounted on a shaft 44 extending longitudinally of the housing member beyond the glass case 38, the member 44 being provided with a knob 45 to rotate the same. A graduated disk or dial 46 is secured to rotate with the shaft 44 to indicate the adjustment in terms of degrees of temperature or other suitable markings. The gear and shaft of the adjusting mechanism are respectively journaled to rotate in the casing by means of a projecting bracket member 47 shown in Fig. 2. The thermal unit may be secured at its base 48 to a switch board or to the wall 49 of a water heater so that the spiral member 1 is responsive to the temperature changes within the water heater or the heat of the resistor element 25 or both for the purpose as will be hereinafter set forth.

As shown in Fig. 4 the stationary contacts 18, 19, 20 and 21 are connected by terminal leads 50, 51, 52 and 53 which extend through insulating bushings 54 to the outside of the housing for electrically connecting the thermostatic switch in a circuit as shown in Fig. 1.

Referring to Fig. 1, the thermostatic switch together with a water heater 57 and a range 58, whose operation it is adapted to control, are shown connected to a three-wire source of current supply in circuit relation with a main switch 55 and meters 56. The water heater 57 is connected in series across the outer legs of the circuit and to the terminals 18 and 19 which are connected to the tilting switch 6. The resistor element is connected to the terminals 20 and 21 which are in series with the neutral leg between the entrance switch and range. The terminals 20 and 21 are connected to the terminals 15 and 16 of the tilting switch 7 as previously explained.

The operation of this device is briefly as follows:

The spiral member 1 is adjusted so that the shaft 3 with which it is connected will be actuated at a certain temperature thereby tilting the mercury switch 6 breaking the circuit across its terminals and opening the water heater circuit. This function may be brought about in two ways, namely, by the temperature rise of the water in the heater if the thermostatic switch unit is mounted with its base 48 secured to the heater wall 49 as shown in Fig. 2, or by the unbalanced load in the neutral leg of the range circuit which is connected to the resistor element 25. In the latter occurrence the rotating of the disk 4 will tilt the switch 6 and open the water heater circuit the same as when the shaft 3 is actuated when the member 1 is responsive to temperature rise in the water of the heater. If when the water heater circuit is opened the unbalanced load in the neutral of the range increases, the heat of the resistor 25 will increase, resulting in an increased rotation of the shaft 3, thereby tilting the switch 7 to a position where the mercury will establish a circuit across its terminals forming a by-pass or shunt on the resistor 25, thus reducing the heat generated in the resistor to zero. If the resistor element 25 should be burned out or damaged in any way the current will pass across the gap constituted by the contacts 28 and 29 and through the high resistance wire 31 which will be burned out to allow the gap to close thereby establishing a shunt across the resistor.

When the range 58 is deenergized the heat in the thermal chamber will drop by radiation and convection so that when the temperature in the thermal chamber again reaches normal the shaft 3 will tilt the switches in the reverse direction to again close the water heater circuit. If during the operation of the range the temperature of the thermal chamber drops thereby actuating the shaft 3 the mercury switch 7 will be tilted to open the shunt across the resistor 25 which will be rapidly heated by the unbalanced load current to prevent the further rotation of the shaft thereby preventing the closing of the water heater switch 6, the switches being so mounted on their common supporting disk 4 that they will operate at a sufficient time lag to regulate the water heater and range circuits as explained. The total rotative or angular movement of the disk 4 through which the mercury switches operate is approximately sixty degrees.

Where it is intended to utilize the device as a thermal switch only for water heaters, but one mercury switch is necessary since the by-pass or shunt switch 7 and the resistor member 25 with which it is connected need not be utilized. In this manner the switch would be set to trip at any desired temperature and would automatically close again when the temperature in the thermal chamber falls.

The by-pass switch 7 must be employed when the thermostatic switch is used as a range-water heater alternating switch on account of the large variation in the heat generated in the resistor element in accordance with the change of the unbalanced load in the range neutral corresponding to the capacity of the range which is ordinarily rated at a maximum unbalanced load of 3000 watts. Since the energy consumed by the resistor member varies as the square of the current flowing in the range neutral, it will be seen that the heat generated at 1000 watts will be one-ninth of that generated at 3000 watts so that the by-pass functions to prevent a dangerous rise at full load.

Connecting the resistor element in the neutral leg of a three-wire range circuit for picking up energy to operate a range water heater alternating switch is a novel expedient and provides a ratio between the desired tripping current and the total current to be handled by the device twice as great as when the two outside legs of the circuit are utilized. Other advantages are that but a single circuit is required instead of two to wire the thermostatic switch from the range circuit and since the potential of a neutral circuit is zero with respect to the ground the insulation difficulties in the switch unit and danger of accidental short-circuits therein are materially reduced.

It is evident from the foregoing description of my invention that a thermostatic switch unit made in accordance therewith provides a simple and efficient combination range and water alternating switch or relay and simultaneously or independently functions as a water heater thermal switch. By the use of my device a great saving of electrical energy is effected and the matter of regulating the water-heater and range loads is automatically and positively accomplished. My device functioning as a water heater thermal switch also eliminates the fire hazards incidental to water heaters of large capacity.

Although I have described several embodiments of my invention it will be obvious to those skilled in the art that various modifications may be made in the details of construction and in the adaptation of my invention for other uses without departing from the principles herein set forth, for instance, the water heater may be connected between the neutral and outside leg of the heating circuit, in other words a 110 volt as well as a 220 volt water heater may be employed.

I claim:

1. A thermostatic switch comprising a bi-metallic bar, an operating shaft secured to and adapted to be actuated by said bar, a plurality of mercury switches associated with and adapted to operate with the movement of said shaft, and a resistor element mounted adjacent said bar, said mercury switches being adapted for operation by the actuating characteristics of said bar responsive to the heat variations of said resistor element and one of said switches constituting a by-pass on said resistor element.

2. A thermostatic switch comprising a bi-metallic bar, an operating shaft secured to and adapted to be actuated by said bar, a plurality of mercury switches associated with and adapted to operate with the movement of said shaft, and a resistor element mounted adjacent said bar to heat the same, one of said mercury switches being adapted to automatically control a heating circuit and the other of said switches functions as a by-pass or shunt on said resistor element.

3. A thermostatic switch comprising a bi-metallic bar, an operating shaft secured to and adapted to be actuated by said bar, a pair of mercury switches mounted for tilting movement on said shaft, a resistor element mounted adjacent said bar and having an electrical connection with one of said mercury switches, and a gap connected across said resistor and adapted to close at a predetermined temperature of the latter.

4. A thermostatic switch comprising a housing member having a partition to provide a thermal chamber, a bi-metallic bar disposed within said chamber and secured at one end to the housing member, a shaft journaled for rotation in said housing and secured to said bar, a disk mounted on said shaft outside of said chamber, a pair of mercury switches secured to said disk, a resistor element mounted in the thermal chamber adjacent said spiral bar, and connected to one of said switches, and terminal leads extending through said housing and connected to said switches.

5. A thermostatic switch comprising a housing member having a partition to provide a thermal chamber, a bi-metallic bar disposed within said chamber and secured at one end to the housing member, a shaft journalled for rotation in said housing and secured to said bar, a disk mounted on said shaft outside of said chamber, a pair of mercury switches secured to said disk, a resistor element mounted in the thermal chamber adjacent said spiral bar and having an electrical connection with one of said switches, a gap connected across said resistor element, and terminal leads extending through said housing and connected to said switches.

6. A thermostatic switch comprising a housing member having a partition to provide a thermal chamber, a bi-metallic bar disposed within said chamber and adjustably secured at one end to the housing member, a shaft journaled for rotation in said housing and secured to said bar, a disk mounted on said shaft outside of said chamber, a pair of mercury switches secured to said disk, a resistor element mounted in the thermal chamber adjacent said bar and connected to one of said switches, and means for adjusting the bar to be responsive to any desired temperature in the thermal chamber.

7. A thermostatic switch comprising a housing having a thermal chamber disposed in it, a movable member rotatably mounted in said housing, a plurality of mercury switches mounted on said member, a bimetallic bar disposed within said chamber and operably coupled to said movable member, said bimetallic bar being adapted to effect the movement of said mercury switches in response to the normal temperature conditions in the chamber, a resistor element mounted in said chamber adjacent said bar, said resistor element being adapted to be connected in an electric circuit to effect the movement of said mercury switches when a circuit is established through it, and means for connecting one of said mercury switches in shunt circuit relation with said resistor to short circuit the resistor if the resistor gets too hot.

8. A thermostatic switch comprising a movably mounted member having a plurality of switches mounted thereon, a thermal element operably coupled to said movable member and adapted to effect the movement of it in response to the normal temperature conditions surrounding said element, a heating element arranged adjacent said thermal element and adapted to be connected in an electrical circuit for rendering said switch responsive to the temperature conditions produced when a circuit is established through said heating element, and means adapted to connect one of the switches mounted on the movable member in shunt circuit relation with the heating element to short circuit it when its temperature exceeds a predetermined limit.

In testimony whereof, I sign my name.

CLARENCE E. BOGGS.